UNITED STATES PATENT OFFICE.

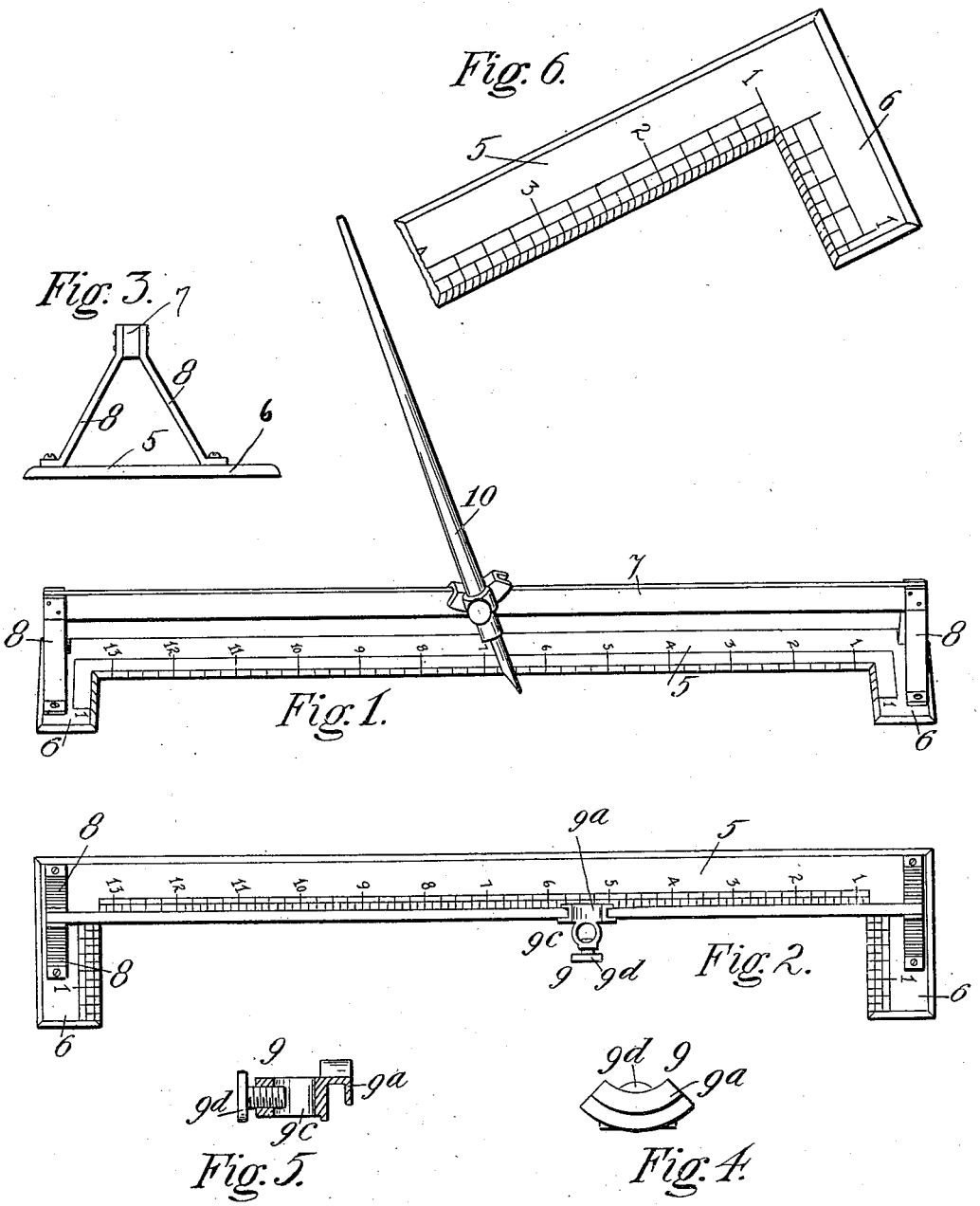

LILIAN B. JONES, OF DENVER, COLORADO.

RULER.

SPECIFICATION forming part of Letters Patent No. 639,814, dated December 26, 1899.

Application filed January 4, 1899. Serial No. 701,151. (No model.)

*To all whom it may concern:*

Be it known that I, LILIAN B. JONES, a citizen of the United States, residing at Denver, in the county of Arapahoe and State of Colorado, have invented certain new and useful Improvements in Rulers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in rulers, my principal objects being to avoid getting ink on the ruler during use with a pen, to facilitate the quick and accurate measurement of the spaces between lines, and to avoid the necessity of using another pen to place ink between the points of a ruling-pen.

In using my improved device the pen does not come in contact with the graduated straight-edge of the ruler. Hence no special care is required in inking the pen. The pen is attached to a guide-bar mounted on the graduated portion of the ruler. The keeper is so constructed that the point of the pen travels in a line at some distance from, but parallel with, the longitudinal member of the ruler's base, which is provided at its extremities with transverse space-guides extending at right angles to the longitudinal member of the ruler. The grooved portion of the keeper engaging the guide-bar is of segmental shape, allowing the keeper to rock on the bar, whereby the pen may be held in a perpendicular position or at any desired inclination thereto in either direction.

Having briefly outlined the purpose of my invention, as well as its more important features of construction, I will proceed to describe the same in detail, reference being made to the accompanying drawings, in which is illustrated an embodiment thereof.

In the drawings, Figure 1 is a perspective view of my invention, showing the pen in position for use. Fig. 2 is a top view of the device with the pen removed. Fig. 3 is an end elevation of the device with the keeper removed. Fig. 4 is a detail view of the keeper, shown in elevation. Fig. 5 is a cross-section taken through the center of the keeper. Fig. 6 is a fragmentary view of the graduated base of my improved ruler.

Similar reference characters indicating corresponding parts in the views, let the numeral 5 designate the long graduated member of the base of the ruler, and 6 the transverse portions, located at the extremities of the member 5 and extending at right angles thereto. The figures indicating the divisions of the graduated portions of these members are conspicuously arranged to catch the eye quickly when the ruler is in position for use. Mounted on, but located above, the base of the ruler is the guide-bar 7, which, as shown in the drawings, is supported by two pairs of legs 8, attached, respectively, to the base extremities. This guide-bar may, however, be supported in any suitable manner. The keeper 9, which holds the pen or pencil, as the case may be, is composed of a segmental part $9^a$, a ring $9^c$, and a set-screw $9^d$. The part $9^a$ is provided with a groove or way, open below to receive the guide-bar 7, its top wall, which engages the bar, being curved to permit the keeper to rock on the bar, whereby the pen or pencil may be made to keep any desired position. The pen 10 is passed through the ring $9^c$ and is held in place by a set-screw $9^d$, which is located in a threaded opening intersecting the opening in the ring. The groove of the keeper is made to fit the guide-bar nicely, whereby the point of the pen is allowed to travel only in a direct line. Hence no special skill is required in drawing straight lines by the aid of my improved instrument. Parallel lines may be readily and accurately drawn at a predetermined distance apart by the use of the transverse space-guides 6, one being located at each extremity of the member 5, as heretofore explained.

From the foregoing description it is believed that the advantages of my improved ruler will be readily understood. It is also believed that the manner of using the device will be apparent without special explanation.

Having thus described my invention, what I claim is—

1. A ruler, comprising a base and a rigid guide-bar mounted thereon, and supported by the base, and a keeper comprising a ring adapted to hold a pen or pencil and constructed to slide on said guide.

2. A ruler, comprising a base having a longitudinal graduated member, a graduated transverse member rigidly attached to each extremity of the longitudinal member, a rigid guide-bar suitably mounted on the base and a keeper comprising a member grooved to engage the guide-bar, and a ring attached to the grooved member and adapted to hold a pen or pencil.

3. A ruler, comprising a graduated base, a rigid guide-bar, a suitable device located at each extremity of the base for supporting the guide-bar and a keeper constructed to hold a pen or pencil and having a groove open below, its top wall being curved to permit the keeper to rock on the guide-bar.

4. The combination with a ruler having a guide-bar, of a keeper comprising a ring adapted to receive and hold a pen or pencil, and a portion provided with a groove having a curved wall adapted to rest and slide on the guide-bar.

5. In a ruler, the combination of a base comprising a longitudinal member and a transverse member located at each end of the longitudinal member, a guide-bar mounted on the base, and a keeper comprising a ring adapted to receive a pen or pencil, a set-screw attached to the ring and adapted to hold the pen or pencil, and a grooved portion mounted on the ring and arranged to slide on the guide-bar.

6. A ruler for drawing straight lines, comprising a base, a guide-bar mounted on the base, and a keeper provided with a ring adapted to hold the marking device and arranged to slide on the guide-bar.

7. A ruler, comprising a base having a longitudinal member and transverse end members, a guide-bar mounted on the base, and a keeper comprising a segmental member having a groove open below to receive the guide-bar, its top wall being curved to rock on said bar, and a ring adapted to hold the marking device and arranged to slide on the guide-bar.

8. A ruler, comprising a base, a guide-bar mounted thereon, and a keeper slidingly mounted on the guide-bar and provided with a ring adapted to hold the marking device in a position to prevent its engagement with the base.

LILIAN B. JONES.

Witnesses:
 AMY RICE,
 ELSIE AUCHINVOLE.